(12) United States Patent
Kwak et al.

(10) Patent No.: US 12,177,350 B2
(45) Date of Patent: Dec. 24, 2024

(54) EXTENSION CRYPTOGRAPHIC OPERATION PROCESSING SYSTEM AND METHOD

(71) Applicant: TEEware Co., Ltd., Daejeon (KR)

(72) Inventors: Nohyun Kwak, Daejeon (KR); Yunjong Jeong, Daejeon (KR)

(73) Assignee: TEEware Co., Ltd., Daejeon (KR)

( * ) Notice: Subject to any disclaimer, the term of this patent is extended or adjusted under 35 U.S.C. 154(b) by 194 days.

(21) Appl. No.: 17/866,073

(22) Filed: Jul. 15, 2022

(65) Prior Publication Data

US 2022/0360445 A1 Nov. 10, 2022

Related U.S. Application Data

(63) Continuation of application No. PCT/KR2020/016249, filed on Nov. 18, 2020.

(30) Foreign Application Priority Data

Sep. 11, 2020 (KR) .................. 10-2020-0116653

(51) Int. Cl.
*H04L 9/32* (2006.01)
*H04L 9/08* (2006.01)
*H04L 9/40* (2022.01)

(52) U.S. Cl.
CPC ............ *H04L 9/321* (2013.01); *H04L 9/0819* (2013.01); *H04L 63/0428* (2013.01)

(58) Field of Classification Search
CPC ... H04L 9/321; H04L 9/0819; H04L 63/0428; H04L 9/0897; H04L 9/3234; H04L 9/3273; H04L 9/0877; H04L 9/0827; H04W 12/068
See application file for complete search history.

(56) References Cited

U.S. PATENT DOCUMENTS

| | | | |
|---|---|---|---|
| 8,055,913 B2 * | 11/2011 | Ginter | G06F 21/78 713/170 |
| 2004/0034860 A1 * | 2/2004 | Fernando | G06F 9/46 719/315 |
| 2006/0149962 A1 | 7/2006 | Fountain et al. | |
| 2012/0331550 A1 * | 12/2012 | Raj | G06F 21/575 726/22 |
| 2019/0103961 A1 * | 4/2019 | Chhabra | H04L 9/0838 |
| 2019/0342079 A1 | 11/2019 | Rudzitis et al. | |

* cited by examiner

*Primary Examiner* — Sm A Rahman

(74) *Attorney, Agent, or Firm* — David L. Nocilly; Bond Schoeneck & King PLLC

(57) ABSTRACT

Disclosed are an extension cryptographic operation processing system and method. An extension cryptographic operation processing method of a processing device including a trusted execution environment can be performed by at least one processor constituting the trusted execution environment of the processing device.

5 Claims, 7 Drawing Sheets

EXTENSION CRYPTOGRAPHIC OPERATION PROCESSING SYSTEM AND METHOD

CROSS-REFERENCES TO RELATED APPLICATIONS

This is a continuation of International Application No. PCT/KR2020/016249, filed Nov. 18, 2020, which claims benefit of Korean Patent Application No. 10-2020-0116653, filed on Sep. 11, 2020.

BACKGROUND

Technical Field

The following description relates to an extension cryptographic processing method.

This work was supported by Public-Private Partnership Based ICT Startup Growth Program funded by the Korea Ministry of Science and ICT (No. 1711120138, 2020-0-01684-001).

Related Art

A trusted execution environment (TEE) refers to a safe computing environment that is configured using a function installed in a central processing unit (CPU) (a processor) and may provide a separate independent secure area in a main processor. In a processor in which a normal area and a secure area are divided, important information, such as biometric information, payment information, and a corporate security document, may be stored in the secure area, information exchange with the normal area may be controlled, and security software may be safely executed.

Currently, various computer systems are using passwords for database encryption, encrypted communication, and authentication. To use a password safely, an encryption key needs to be properly managed. A system that manages the encryption key (hereinafter, a key management system) needs to prevent an unauthorized access to the encryption key. The key management system performs generation and storage of the encryption key, and a cryptographic operation using the encryption key. Commonly used cryptographic operations are almost determined (fixed), but for various reasons, non-standard algorithms (e.g., zero-knowledge proof (ZKP), multi-party computation (MPC), post quantum cryptography (PQC), etc.) may be used. Also, hardware security module (HSM) vendors provide a function (e.g., a functional module in a form of a C library or a plug-in in a form of Lua script) that allows a user to add an algorithm.

To provide an extension program for such an additional function, in the related art, the extension program is loaded to a memory space of the key management system and called and used using a library call method. The related art has advantages in that a structure is simple and the encryption key is not exported to the outside of the key management system.

However, this related art may have constraints in a form of the extension program. For example, since the extension program needs to be loaded to the memory space such as the key management system, only a language similar to the key management system may be used and it is difficult to use an external module when writing the extension program.

Also, the aforementioned related art has an issue in that vulnerability of the extension program may spread to the entire key management system. Since the extension program may be arbitrarily created and installed by a developer, there is a higher probability of the vulnerability than the key management system. If the vulnerability of the extension program is attacked, the key management system present in the same memory space may be attacked and other irrelevant keys than the encryption key used by the extension program may also be leaked or damaged.

SUMMARY

One or more example embodiments provide an extension cryptographic processing method and system that may reduce constraints on writing an extension program and may limit a damage even though vulnerability is present in the extension program by placing the extension program outside a key management system, by delivering the encryption key to a network through a mutual authentication, and by processing a cryptographic operation.

According to at least one example embodiment, there is provided an extension cryptographic processing method of a processing device including a trusted execution environment (TEE), the extension cryptographic processing method including establishing, by at least one processor that constitutes the TEE of the processing device, a secure communication channel with an extension program platform in which an extension program is installed; receiving, by the at least one processor, an extension cryptographic operation request; delivering, by the at least one processor, the extension cryptographic operation request and an encryption key for processing of the extension cryptographic operation request to an extension program corresponding to the extension cryptographic operation request among extension programs installed in the extension program platform through the established secure communication channel; receiving, by the at least one processor, an operation result of the extension cryptographic operation request processed using the encryption key by way of the extension program corresponding to the extension cryptographic operation request from the extension program platform through the secure communication channel; and providing, by the at least one processor, the received operation result.

According to an aspect, the extension cryptographic processing method may further include receiving, by the at least one processor, information on an identifier of the extension program and at least one encryption key processible by the extension program from an application that requests registration of the extension program; and storing, by the at least one processor, the received information on the identifier and the at least one encryption key. The identifier may include a hash value for at least a portion of a code of the extension program.

According to another aspect, the establishing of the secure communication channel may include receiving an establishment request of the secure communication channel from the extension program platform; determining whether the extension program corresponding to the establishment request is a registered extension program through the identifier included in the establishment request; and when the extension program corresponding to the establishment request is the registered extension program, performing a key exchange for encryption communication between the extension program platform and the extension program corresponding to the establishment request.

According to still another aspect, the extension cryptographic operation request may include an identifier of the corresponding extension program, information on an encryption key to be used for the extension program, and contents of the extension cryptographic operation request, and the delivering may include verifying whether the corresponding extension program is a registered extension program through the identifier; verifying whether the corresponding extension program is accessible to the encryption key; verifying whether the secure communication channel for communication with the corresponding extension program is established; and transmitting the encryption key and the contents of the extension cryptographic operation to the corresponding extension program through the secure communication channel.

According to at least one example embodiment, there is provided a computer program stored in a computer-readable record medium to execute the method in a computer apparatus in conjunction with the computer apparatus.

According to at least one example embodiment, there is provided a computer-readable record medium in which a program to execute the method in a computer apparatus is recorded.

According to at least one example embodiment, there is provided a computer apparatus including a TEE, including at least one processor configured to execute computer-readable instructions and constituting the TEE of the computer apparatus, such that the at least one processor is configured to, establish a secure communication channel with an extension program platform in which an extension program is installed, receive an extension cryptographic operation request, deliver the extension cryptographic operation request and an encryption key for processing of the extension cryptographic operation request to an extension program corresponding to the extension cryptographic operation request among extension programs installed in the extension program platform through the established secure communication channel, receive an operation result of the extension cryptographic operation request processed using the encryption key by way of the extension program corresponding to the extension cryptographic operation request from the extension program platform through the secure communication channel, and provide the received operation result.

According to some example embodiments, it is possible to reduce constraints on writing an extension program and to limit a damage even though vulnerability is present in the extension program by placing the extension program outside a key management system, by delivering the encryption key to a network through a mutual authentication, and by processing a cryptographic operation.

DETAILED DESCRIPTION

Figure 1:
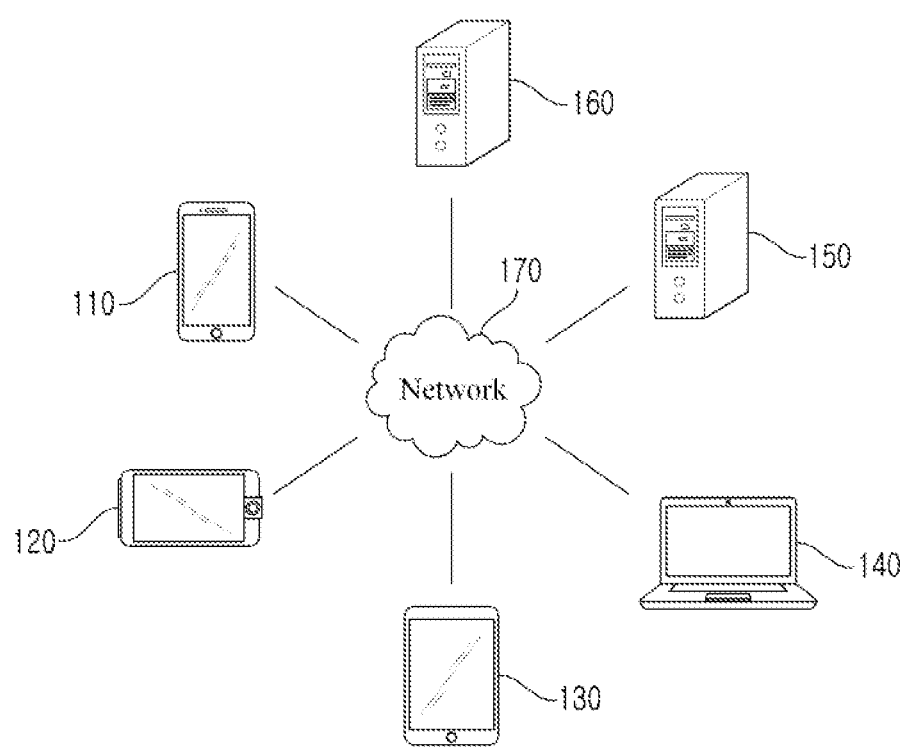
FIG. 1 is a diagram illustrating an example of a network environment according to an example embodiment.

Various modifications may be made to the disclosure and specific example embodiments are illustrated in the drawings and described in detail in the detailed description. However, it should be understood that it is not construed as limited to a specific implementation and should be understood to include all changes, equivalents, and replacements within the idea and the technical scope of the disclosure. Like reference numerals refer to like elements in describing each drawing.

Although terms of "first," "second," "A," and "B," and the like are used to explain various components, the components are not limited to such terms. These terms are used only to distinguish one component from another component. For example, a first component may be referred to as a second component, or similarly, the second component may be referred to as the first component within the scope of the present disclosure. Term "and/or" includes any one and any combination of any two or more of the associated listed items.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly accessed" to another component, still other component may not be present therebetween.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described with reference to the accompanying drawings.

An extension cryptographic operation processing system according to the example embodiments may be implemented by at least one computer apparatus and an extension cryptographic operation processing according to the example embodiments may be performed by at least one computer apparatus included in the extension cryptographic operation processing system. Here, a computer program according to an example embodiment may be installed and executed on the computer apparatus, and the computer apparatus may perform the extension cryptographic operation processing method according to the example embodiments under control of the executed computer program. The aforementioned computer program may be stored in a computer-readable storage medium to computer-implement the extension cryptographic operation processing method in conjunction with the computer apparatus. The computer apparatus may be a processing device in which a trusted execution environment (TEE) is configured using a function installed in at least one processor.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a cryptographic operation processing service, an archiving service, a file distribution service, a map service, a content providing service, a group call service (or an audio conference service), a messaging service, a mail service, a social network service, a map service, a translation service, a financial service, a payment service, a search service, etc.) to the plurality of electronic devices 110, 120, 130, and 140 connected over the network 170.

Figure 2:
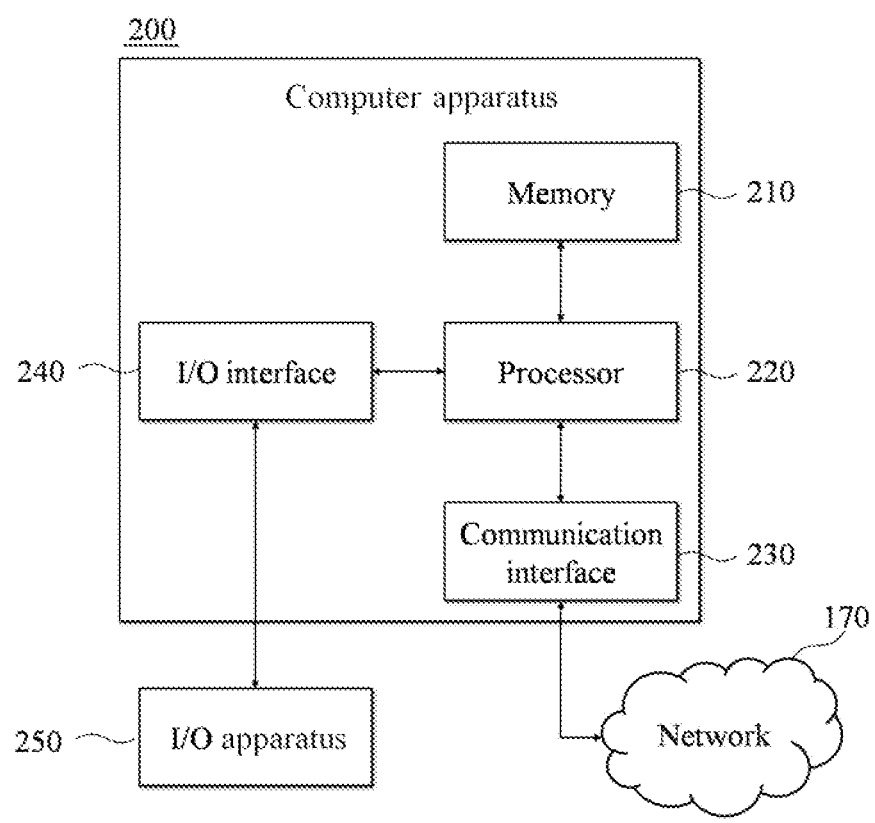
FIG. 2 is a diagram illustrating an example of a computer apparatus according to an example embodiment.

FIG. 2 is a block diagram illustrating an example of a computer apparatus according to an example embodiment. Each of the plurality of electronic devices 110, 120, 130, and 140 of FIG. 1 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another computer-readable record medium separate from the memory 210. The other computer-readable record medium may include a computer-readable record medium, for example, a floppy drive, a disk, a tape, a DVD/CD-ROM drive, a memory card, etc. According to other example embodiments, software components may be loaded to the memory 210 through the communication interface 230, instead of the computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in the storage device, such as the memory 210. Here, the processor 220 may provide a function for configuring a safe computing environment, such as a TEE, in a processing device such as the computer apparatus 200.

The communication interface 230 may provide a function for communication between the communication apparatus 200 and another apparatus (e.g., the aforementioned storage devices) over the network 170. For example, the processor 220 of the computer apparatus 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium (e.g., the permanent storage device) further includable in the computer apparatus 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

Also, according to other example embodiments, the computer apparatus 200 may include a number of components greater than or less than a number of components shown in FIG. 2. However, there is no need to clearly illustrate many components according to the related art. For example, the computer apparatus 200 may include at least a portion of the I/O apparatus 250, or may further include other components, for example, a transceiver, a database, etc.

Figure 3:
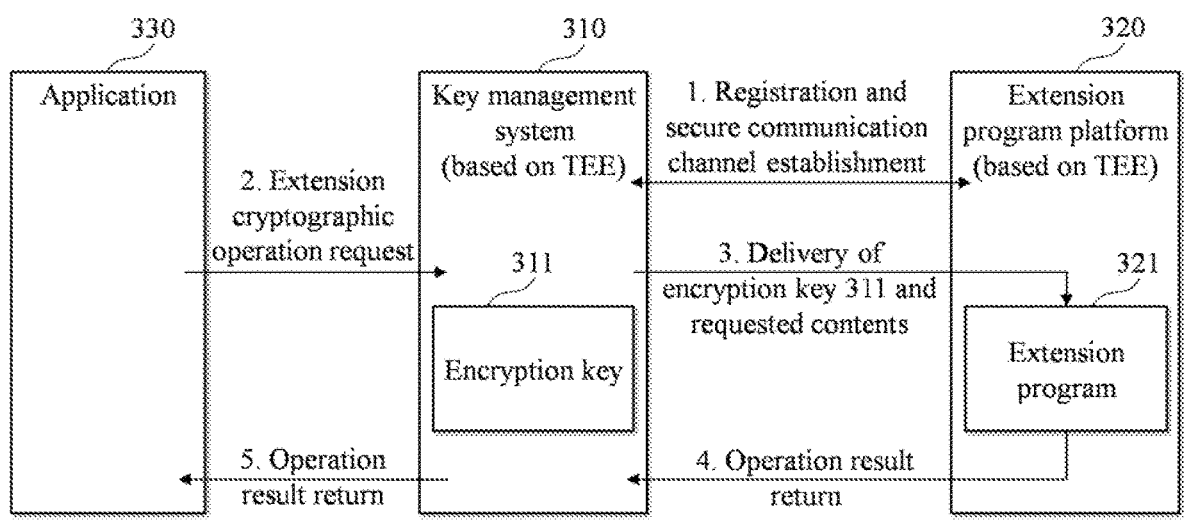
FIG. 3 illustrates an example of an extension cryptographic processing system according to an example embodiment.

FIG. 3 illustrates an example of an extension cryptographic processing system according to an example embodiment. FIG. 3 illustrates a key management system 310, an extension program platform 320, and an application 330. Each of the key management system 310 and the extension program platform 320 may be based on a TEE. For example, a secure computing environment may be implemented through an individual processor in each of the key management system 310 and the extension program platform 320. Each of the key management system 310 and the extension program platform 320 may be implemented by a physical processing device, such as the computer apparatus 200 of FIG. 2. Also, the application 330 may be a computer program installed in a physical processing device separate from the key management system 310. Here, it may be a computer program included in the processing device that implements the key management system 310 or the extension program platform 320.

The key management system 310 may register an extension program 321 and may establish a secure communication channel with the registered extension program 321 (1. Registration and secure communication channel establishment in FIG. 3). For example, in response to a request from the application 330 that desires to use the extension program 321 installed in the extension program platform 320, the key management system 310 may register the extension program 321 and may establish the secure communication channel with the registered extension program 321. Registration of the extension program 321 and establishment of the secure communication channel are further described with reference to FIGS. 5 and 6.

When the extension program 321 is registered and the secure communication channel with the registered extension program 321 is established, the key management system 310 may deliver an encryption key 311 for the requested extension cryptographic operation and requested contents to the extension program 321 through the secure communication channel (3. Delivery of encryption key 311 and requested contents in FIG. 3) in response to a request from the application 330 that requests the extension cryptographic operation using the extension program 321 (2. Extension cryptographic operation request in FIG. 3).

Here, "extension cryptographic operation" refers to an operation for processing using a function of the extension program 321 and the encryption key 311 stored in the key management system 310, and may include information for identifying the encryption key 311 and the extension program 321 and the requested contents.

Here, the extension program 321 installed in the extension program platform 320 may process the requested contents delivered through the secure communication channel using the encryption key 311 and may return an operation result to the key management system 310 (4. Operation result return in FIG. 3).

The extension cryptographic operation requested by the application 330 may be processed in such a manner that the key management system 310 returns the operation result returned from the extension program 321 to the application 330 (5. Operation result return in FIG. 3).

As described above, the conventional extension cryptographic processing method refers to a method of combining an extension program with a main key management program, such as a C library method of loading an extension program to a key management process through dynamic loading or a method of executing the extension program by embedding a Lua interpreter in a key management program. In contrast, the extension cryptographic processing method according to the example embodiment may be implemented in many more languages since there are few restrictions on an implementation method of the extension program. In theory, since various languages, such as C/C++, Python, Rust, etc., may be supported, an existing code may be reused and a developer may use a familiar language. In particular, since it is important to use a verified code in a cryptography field, code reusability may be greatly improved. Also, since the extension program is loosely coupled with the main key management program through the secure communication channel, the effect of a bug or vulnerability of the extension program over a key management system may be reduced. For example, if the extension program is executed in the same process as the key management program, the entire key management system may be hacked in response to occurrence of the vulnerability of the extension program. Although software defense measures, such as sandboxing, are introduced, hardware-level defense measures, such as TEE, are more secure.

Figure 4:
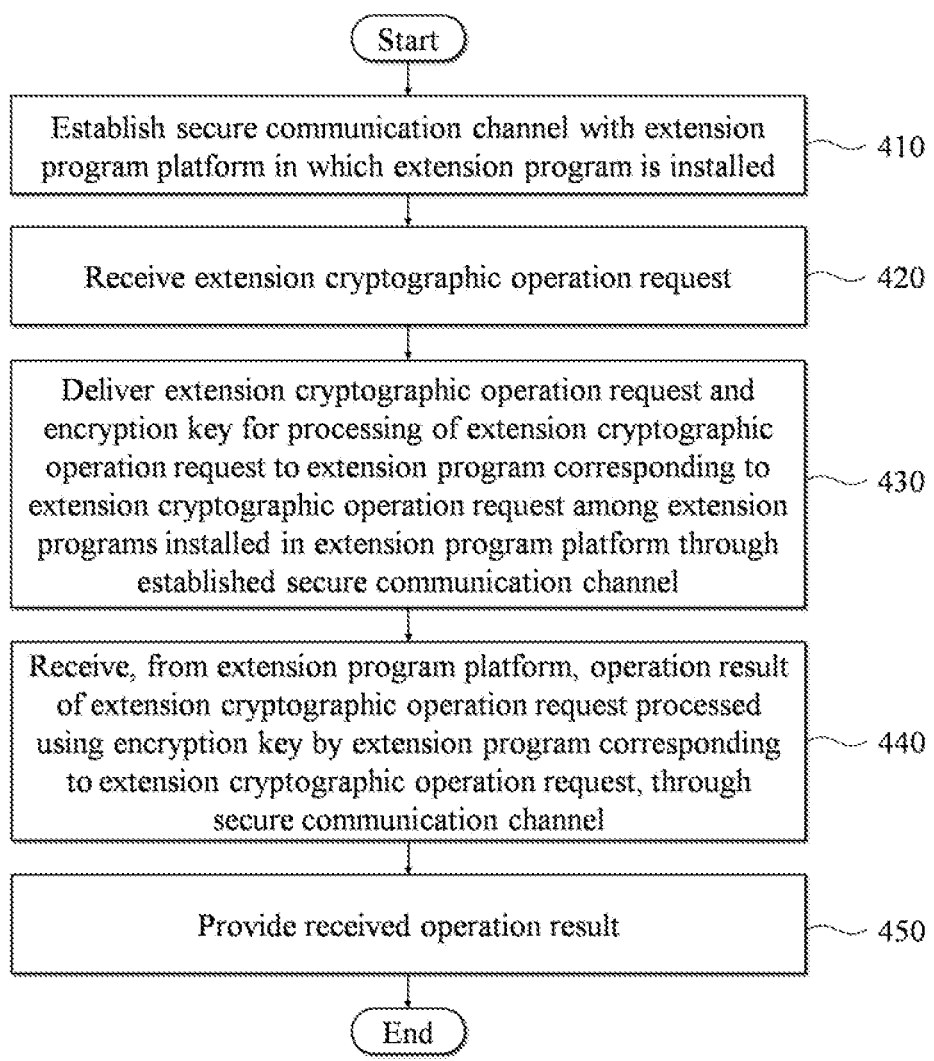
FIG. 4 is a flowchart illustrating an example of an extension cryptographic processing method according to an example embodiment.

FIG. 4 is a flowchart illustrating an example of an extension cryptographic operation processing method according to an example embodiment. The extension cryptographic operation processing method according to the example embodiment may be performed by the computer apparatus 200 that implements the key management system 310 of FIG. 3. Here, the processor 220 of the computer apparatus 200 may be implemented to execute a control instruction according to a code of at least one computer program or a code of an OS included in the memory 210. Also, as described above, the processor 220 may provide a function for configuring a safe computing environment, such as a TEE, to a processing device, such as the computer apparatus 200. Here, the processor 220 may control the computer apparatus 200 to perform operations 410 to 450 included in the method of FIG. 4 in response to the control instruction provided from the code stored in the computer apparatus 200.

In operation 410, the computer apparatus 200 may establish a secure communication channel with an extension program platform in which an extension program is installed. Here, the extension program platform and the extension program may correspond to the extension program platform 320 and the extension program 321 of FIG. 3. Before establishment of the secure communication channel, the extension program may be registered to the computer apparatus 200. The registration of the extension program and the establishment of the secure communication channel are further described with reference to FIGS. 5 and 6.

In operation 420, the computer apparatus 200 may receive an extension cryptographic operation request. As described above with reference to FIG. 3, the extension cryptographic operation request may be generated by an application that desires to receive a processing result of a cryptographic operation and may be delivered to the computer apparatus 200. The application may correspond to the application 330 of FIG. 3.

In operation 430, the computer apparatus 200 may deliver the extension cryptographic operation request and an encryption key for processing of the extension cryptographic operation request to an extension program corresponding to the extension cryptographic operation request among extension programs installed in the extension program platform through the established secure communication channel. A plurality of extension programs may be installed in the extension program platform, and the computer apparatus 200 may register the plurality of extension programs, and may establish a secure communication channel with each of the plurality of extension programs. Therefore, the computer apparatus 200 may deliver the extension cryptographic operation request and the encryption key to the extension program corresponding to the extension cryptographic operation request.

In operation 440, the computer apparatus 200 may receive, from the extension program platform, an operation result of the extension cryptographic operation request processed using the encryption key by way of the extension program corresponding to the extension cryptographic operation request, through the secure communication channel. For example, the computer apparatus 200 that implements the key management system 310 described above with reference to FIG. 3 may process the extension cryptographic operation request using the extension program of the extension program platform implemented outside the computer apparatus 200, without combining the extension program into a program or a process created by the computer apparatus 200.

In operation 450, the computer apparatus 200 may provide the received operation result. For example, the received operation result may be transmitted to the application that delivers the extension cryptographic operation request.

Figure 5:
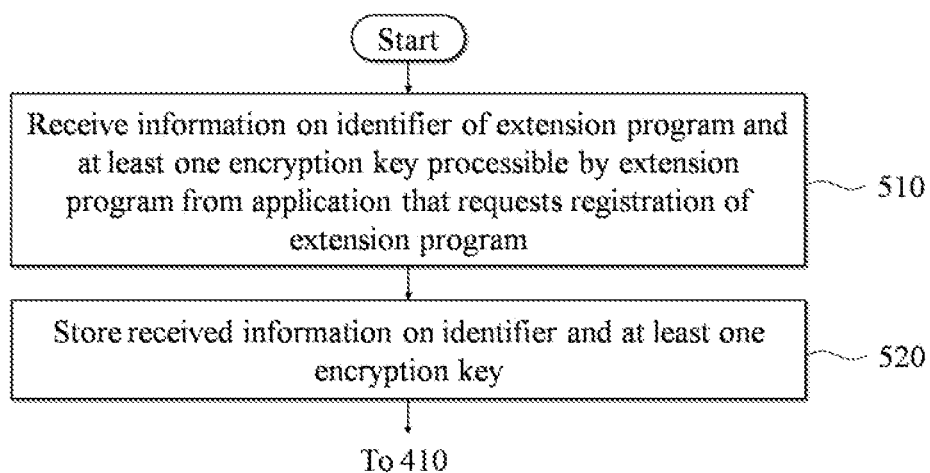
FIG. 5 is a flowchart illustrating an example of a process of registering an extension program according to an example embodiment.

FIG. 5 is a flowchart illustrating an example of a process of registering an extension program according to an example embodiment. Operations 510 and 520 of FIG. 5 may be performed by the computer apparatus 200 before operation 410 of FIG. 4.

In operation 510, the computer apparatus 200 may receive information on an identifier of the extension program and at least one encryption key processible by the extension program from an application that requests registration of the extension program. As described above, the application may correspond to the application 330 of FIG. 3. Also, the identifier may include a hash value for at least a portion of a code of the extension program.

Depending on example embodiments, the application may further deliver information on a list of encryption keys that may be delivered to the extension program or a criterion for classifying such encryption keys. For example, the application may provide information on encryption keys that may be delivered to the extension program to the encryption key to the computer apparatus 200, for example, "Extension program A can handle encryption keys K1, K2, and K3.", "Extension program B can handle a key created by user X.", or "Extension program C can handle a key of which an identifier starts with 'web'.

In operation 520, the computer apparatus 200 may store the received information on the identifier and the at least one encryption key. For example, the computer apparatus 200 may register a specific extension program in association with a relevant encryption key by storing an identifier and an encryption key capable of identifying the extension program in association with each other.

Figure 6:
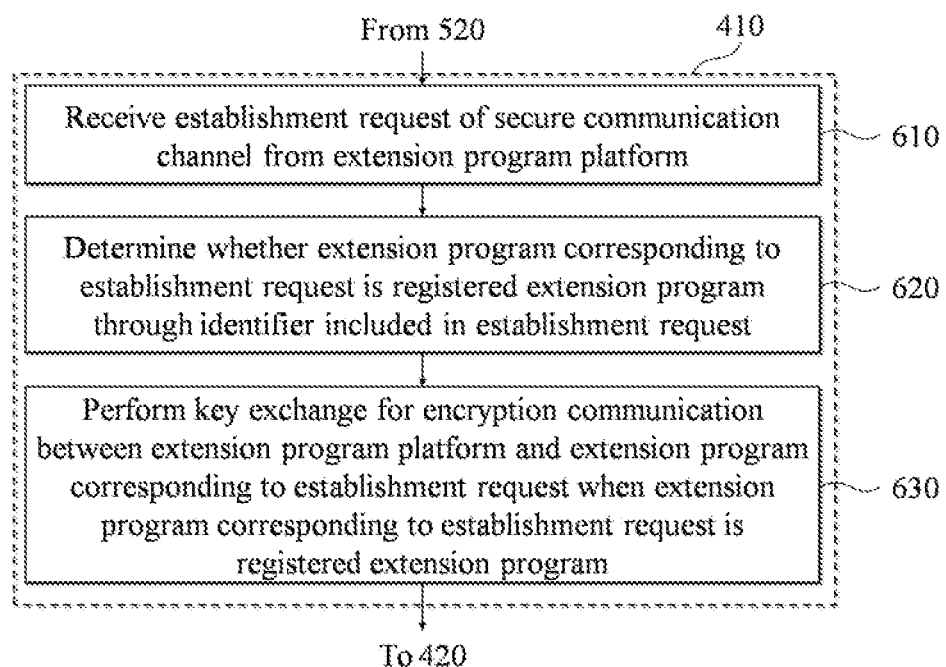
FIG. 6 is a flowchart illustrating an example of a process of establishing a secure communication channel according to an example embodiment.

FIG. 6 is a flowchart illustrating an example of a process of establishing a secure communication channel according to an example embodiment. Operations 610 to 630 of FIG. 6 may be included in operation 410 of FIG. 4 and thereby performed.

In operation 610, the computer apparatus 200 may receive an establishment request of the secure communication channel from the extension program platform. For example, the extension program platform 320 of FIG. 3 may transmit an establishment request including an identifier capable of identifying an extension program to the key management system 310 by running the extension program 321 installed in the extension program platform 320.

Here, as described above with reference to FIG. 5, the identifier may refer to an identifier including a hash value for at least a portion of the code of the extension program. Here, the identifier (a first identifier) included in the request for registration of the extension program and the identifier (a second identifier) included in the establishment request of the secure communication channel may be generated to have the same value. For example, the first identifier and the second identifier may be generated to include a hash value for the same portion in the code of the same extension program.

In operation 620, the computer apparatus 200 may determine whether the extension program corresponding to the establishment request is a registered extension program through the identifier included in the establishment request. For example, the computer apparatus 200 may determine whether the corresponding extension program is the registered extension program depending on whether the first identifier identical to the second identifier is registered.

In operation 630, when the extension program corresponding to the establishment request is the registered extension program, the computer apparatus 200 may perform a key exchange for encryption communication between the extension program platform and the extension program corresponding to the establishment request. Here, the key to be exchanged may be a key used to establish the secure communication channel, which differs from an encryption key for processing the extension cryptographic operation.

Figure 7:
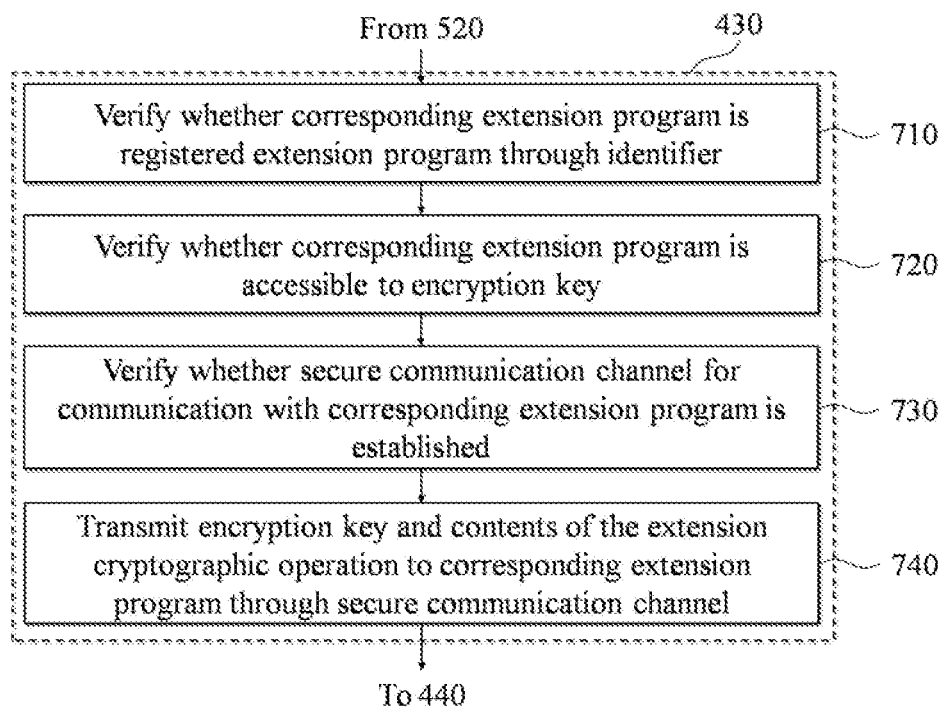
FIG. 7 is a flowchart illustrating an example of a process of delivering an extension cryptographic operation request and an encryption key according to an example embodiment.

FIG. 7 is a flowchart illustrating an example of a process of delivering an extension cryptographic operation request and an encryption key according to an example embodiment. Operations 710 to 740 of FIG. 7 may be included in operation 430 of FIG. 4 and thereby performed. As described above, the extension cryptographic operation request received through operation 420 may include an identifier of the corresponding extension program, information on an encryption key to be used for the extension program, and contents of the extension cryptographic operation request.

In operation 710, the computer apparatus 200 may verify whether the corresponding extension program is a registered extension program through the identifier. Here, the identifier may be a third identifier that includes a hash value for at least a portion of the code of the extension program. For example, the third identifier may be an identifier generated using the same method as the first identifier and the second identifier of FIG. 6. As described above with reference to FIG. 5, the first identifier of the extension program may have been registered already and the computer apparatus 200 may verify whether the extension program corresponding to the third identifier is a registered extension program depending on whether the first identifier identical to the third identifier is registered. When the extension program corresponding to the extension cryptographic operation request is not registered, the process of registration described above with reference to FIG. 5 may be performed.

In operation 720, the computer apparatus 200 may verify whether the corresponding extension program is accessible to the encryption key. As described above with reference to FIG. 5, the application may further deliver information on a list of encryption keys that may be delivered to the extension program or a criterion for classifying such encryption keys. The computer apparatus 200 may determine whether the extension program is accessible to the encryption key stored in the computer apparatus 200 based on such information on the list of encryption keys and the criterion. In detail, when "Extension program A can handle encryption keys K1, K2, and K3." is registered in advance, it can be known that extension program A may access encryption key K1 according to the extension cryptographic operation request.

In operation 730, the computer apparatus 200 may verify whether the secure communication channel for communication with the corresponding extension program is established. For example, the computer apparatus 200 may verify whether a secure communication channel established for the second identifier identical to the third identifier is present. Unless the secure communication channel with the extension program corresponding to the extension cryptographic operation request is established, the process of establishment described above with reference to FIG. 6 may be performed.

In operation 740, the computer apparatus 200 may transmit the encryption key and contents of the extension cryptographic operation to the corresponding extension program through the secure communication channel. Next, the corresponding extension program may process the contents of the extension cryptographic operation using the delivered encryption key and may transmit the operation result of the extension cryptographic operation to the computer apparatus 200. In this case, the computer apparatus 200 may complete processing of the extension cryptographic operation by performing operations 440 and 450 of FIG. 4.

As described above, according to some example embodiments, it is possible to reduce constraints on writing an extension program and to limit a damage even though vulnerability is present in the extension program by placing the extension program outside a key management system, by delivering the encryption key to a network through a mutual authentication, and by processing a cryptographic operation.

For example, since an extension program written in various languages may be executed in a TEE-based extension program platform and may also be used as an external library, it is possible to improve convenience of a developer and development efficiency compared to the existing method. In the case of a cryptographic algorithm, a developer often reuses a verified algorithm code rather than writing a code in person. Considering this, it is a significant advantage that there are few restrictions on writing an extension program.

As another example, since an extension program and a key management system are loosely couped to a network, even though the vulnerability occurs in the extension program, in the worst case, only an encryption key (a key required to process the request) delivered by the key management system is leaked so the damage may be reduced.

The systems or apparatuses described herein may be implemented using hardware components or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, in combination with program instructions, data files, data structures, and the like. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. An extension cryptographic processing method of a processing device including a trusted execution environment (TEE), the extension cryptographic processing method comprising:

registering, by at least one processor that constitutes the TEE of the processing device, an extension program in response to a request from an application;

establishing, by the at least one processor, a secure communication channel with an extension program platform in which the registered extension program is installed;

receiving, by the at least one processor, an extension cryptographic operation request from the application;

delivering, by the at least one processor, the extension cryptographic operation request and an encryption key for processing of the extension cryptographic operation request to an extension program corresponding to the extension cryptographic operation request among extension programs installed in the extension program platform through the established secure communication channel;

receiving, by the at least one processor, an operation result of the extension cryptographic operation request processed using the encryption key by way of the extension program corresponding to the extension cryptographic operation request from the extension program platform through the secure communication channel; and providing, by the at least one processor, the received operation result to the application.

2. The extension cryptographic processing method of claim 1, wherein the registering comprises, receiving information on an identifier of the extension program and at least one encryption key processible by the extension program from the application; and storing the received information on the identifier and the at least one encryption key, wherein the identifier includes a hash value for at least a portion of a code of the extension program.

3. The extension cryptographic processing method of claim 1, wherein the establishing of the secure communication channel comprises:

receiving an establishment request of the secure communication channel from the extension program platform;

determining whether the extension program corresponding to the establishment request is a registered extension program through the identifier included in the establishment request; and when the extension program corresponding to the establishment request is the registered extension program, performing a key exchange for encryption communication between the extension program platform and the extension program corresponding to the establishment request.

4. The extension cryptographic processing method of claim 1, wherein the extension cryptographic operation request includes an identifier of the corresponding extension program, information on an encryption key to be used for the extension program, and contents of the extension cryptographic operation request, and the delivering comprises:

verifying whether the corresponding extension program is a registered extension program through the identifier;

verifying whether the corresponding extension program is accessible to the encryption key;

verifying whether the secure communication channel for communication with the corresponding extension program is established; and transmitting the encryption key and the contents of the extension cryptographic operation to the corresponding extension program through the secure communication channel.

5. A computer apparatus comprising a trusteed execution environment (TEE), the computer apparatus comprising:

at least one processor configured to execute computer-readable instructions and constituting the TEE of computer apparatus, such that the at least one processor is configured to, register an extension program in response to a request from an application, establish a secure communication channel with extension program platform in which the registered extension program is installed, receive an extension cryptographic operation request from the application, deliver the extension cryptographic operation request and an encryption key for processing of the extension cryptographic operation request to an extension program corresponding to the extension cryptographic operation request among extension programs installed in the extension program platform through the established secure communication channel, receive an operation result of the extension cryptographic operation request processed using the encryption key by way of the extension program corresponding to the extension cryptographic operation request from the extension program platform through the secure communication channel, and provide the received operation result to the application.

* * * * *